(12) United States Patent
Mishina et al.

(10) Patent No.: US 12,482,086 B2
(45) Date of Patent: Nov. 25, 2025

(54) DEFECT INSPECTION APPARATUS

(71) Applicant: SHIMADZU CORPORATION, Kyoto (JP)

(72) Inventors: Naoto Mishina, Kyoto (JP); Hirofumi Okamoto, Kyoto (JP); Takashi Tanaka, Kyoto (JP); Satoru Sugimoto, Kyoto (JP); Masashi Hayakawa, Kyoto (JP); Takahide Hatahori, Kyoto (JP); Hiroshi Horikawa, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 80 days.

(21) Appl. No.: 18/026,716

(22) PCT Filed: Sep. 15, 2021

(86) PCT No.: PCT/JP2021/033951
§ 371 (c)(1),
(2) Date: Mar. 16, 2023

(87) PCT Pub. No.: WO2022/059710
PCT Pub. Date: Mar. 24, 2022

(65) Prior Publication Data
US 2023/0401688 A1    Dec. 14, 2023

(30) Foreign Application Priority Data
Sep. 18, 2020  (JP) .................................. 2020-157140

(51) Int. Cl.
*G06T 7/00*      (2017.01)
*G01N 21/01*     (2006.01)
*G01N 21/45*     (2006.01)

(52) U.S. Cl.
CPC ........... *G06T 7/0004* (2013.01); *G01N 21/01* (2013.01); *G01N 21/45* (2013.01); *G01N 2201/06113* (2013.01); *G06T 2207/30204* (2013.01)

(58) Field of Classification Search
None
See application file for complete search history.

(56) References Cited

U.S. PATENT DOCUMENTS

2007/0127015 A1    6/2007  Palmateer et al.
2008/0310702 A1*  12/2008  Taguchi ................. G06T 7/001
                                                 382/141

(Continued)

FOREIGN PATENT DOCUMENTS

EP    0 704 821 A2    4/1996
JP    H08-091543 A    4/1996

(Continued)

OTHER PUBLICATIONS

International Search Report for corresponding Application No. PCT/JP2021/033951, mailed Dec. 7, 2021.

(Continued)

*Primary Examiner* — Samira Monshi
(74) *Attorney, Agent, or Firm* — Renner, Otto, Boisselle & Sklar, LLP

(57) ABSTRACT

A defect inspection apparatus (100) includes an imager (image sensor 35) configured to image an inspection target 7, and a display (6) configured to display an image based on an image captured by the imager. The defect inspection apparatus (100) also includes a controller (4) configured or programmed to receive a setting of a marking (64) in a predetermined region of interest (S) on the image (still image 61) displayed on the display (6). The controller (4) is configured or programmed to inspect the inspection target (7) for a defect based on the image captured by the imager, (Continued)

and superimpose an image of the marking (64) on a position corresponding to the predetermined region of interest (S) in an image of an inspection result (overlay image 65) displayed on the display (6).

17 Claims, 8 Drawing Sheets

(56) References Cited

U.S. PATENT DOCUMENTS

| | | | |
|---|---|---|---|
| 2016/0098828 A1 | 4/2016 | Ito et al. | |
| 2017/0350690 A1 | 12/2017 | Hatahori et al. | |
| 2018/0283847 A1 | 10/2018 | Hatahori et al. | |
| 2021/0072165 A1* | 3/2021 | Kaneko | G01N 23/04 |
| 2022/0051390 A1 | 2/2022 | Yoshida et al. | |

FOREIGN PATENT DOCUMENTS

| | | |
|---|---|---|
| JP | 2009-518625 A | 5/2009 |
| JP | 2013-171026 A | 9/2013 |
| JP | 2013-205377 A | 10/2013 |
| JP | 2016-075554 A | 5/2016 |
| JP | 2017-219318 A | 12/2017 |
| JP | 2018-169204 A | 11/2018 |
| WO | 2020/003917 A1 | 1/2020 |
| WO | 2020/110197 A1 | 6/2020 |

OTHER PUBLICATIONS

Written Opinion for corresponding Application No. PCT/JP2021/033951, mailed Dec. 7, 2021.
Decision of Refusal for corresponding Japanese Patent Application No. 2022-550587 drafted Mar. 29, 2024 and mailed Apr. 2, 2024, with English machine translation.
Notice of Reasons for Refusal for corresponding Japanese Patent Application No. 2022-550587 drafted Oct. 17, 2023 and mailed Oct. 24, 2023, with English machine translation.
Notice of Reasons for Refusal for corresponding Japanese Patent Application No. 2024-100718, mailed Jul. 8, 2025, with machine translation.
Office Action for corresponding Chinese Patent Application No. 202180063141.6 dispatched Aug. 26, 2025, with English machine translation.

\* cited by examiner

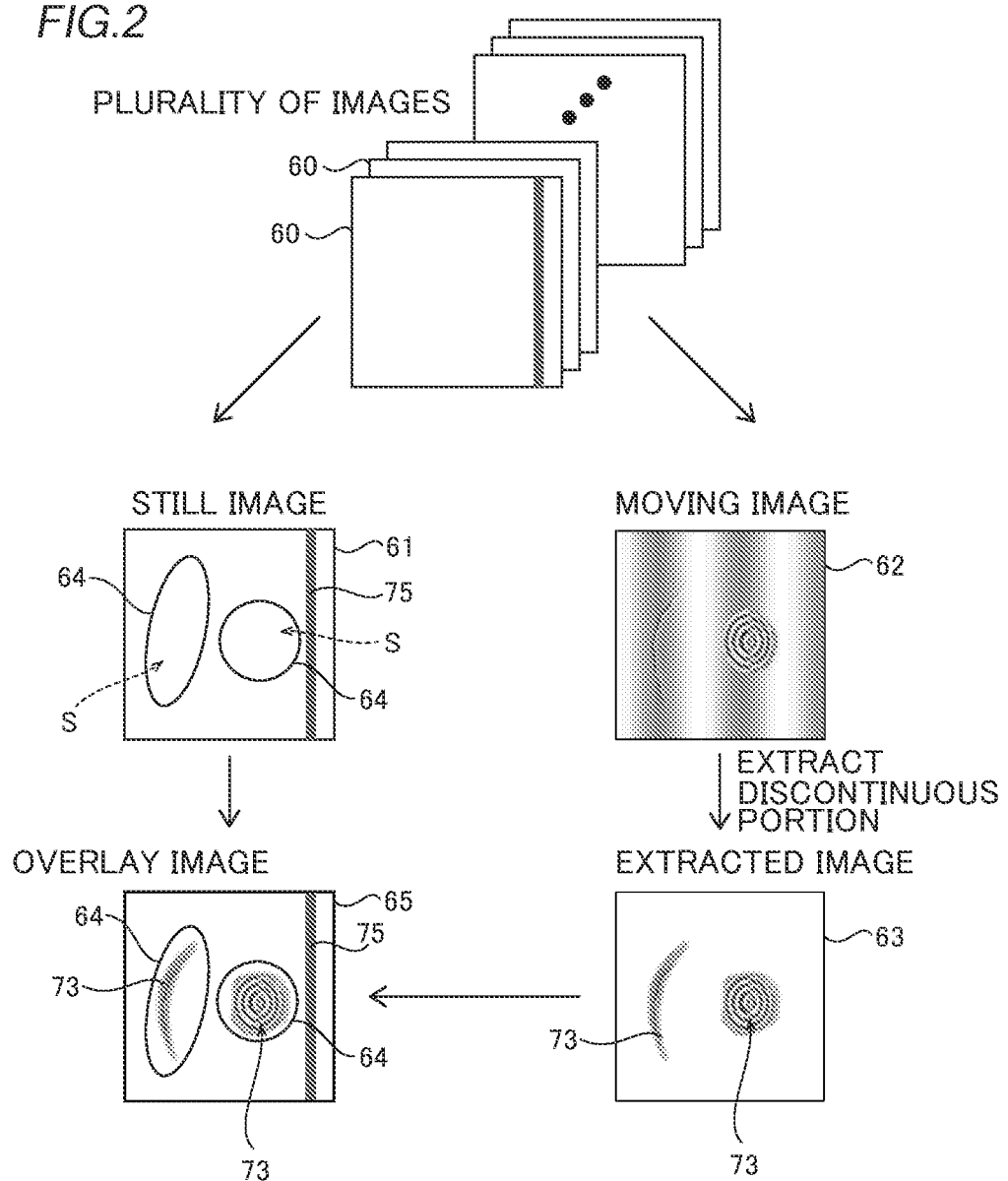

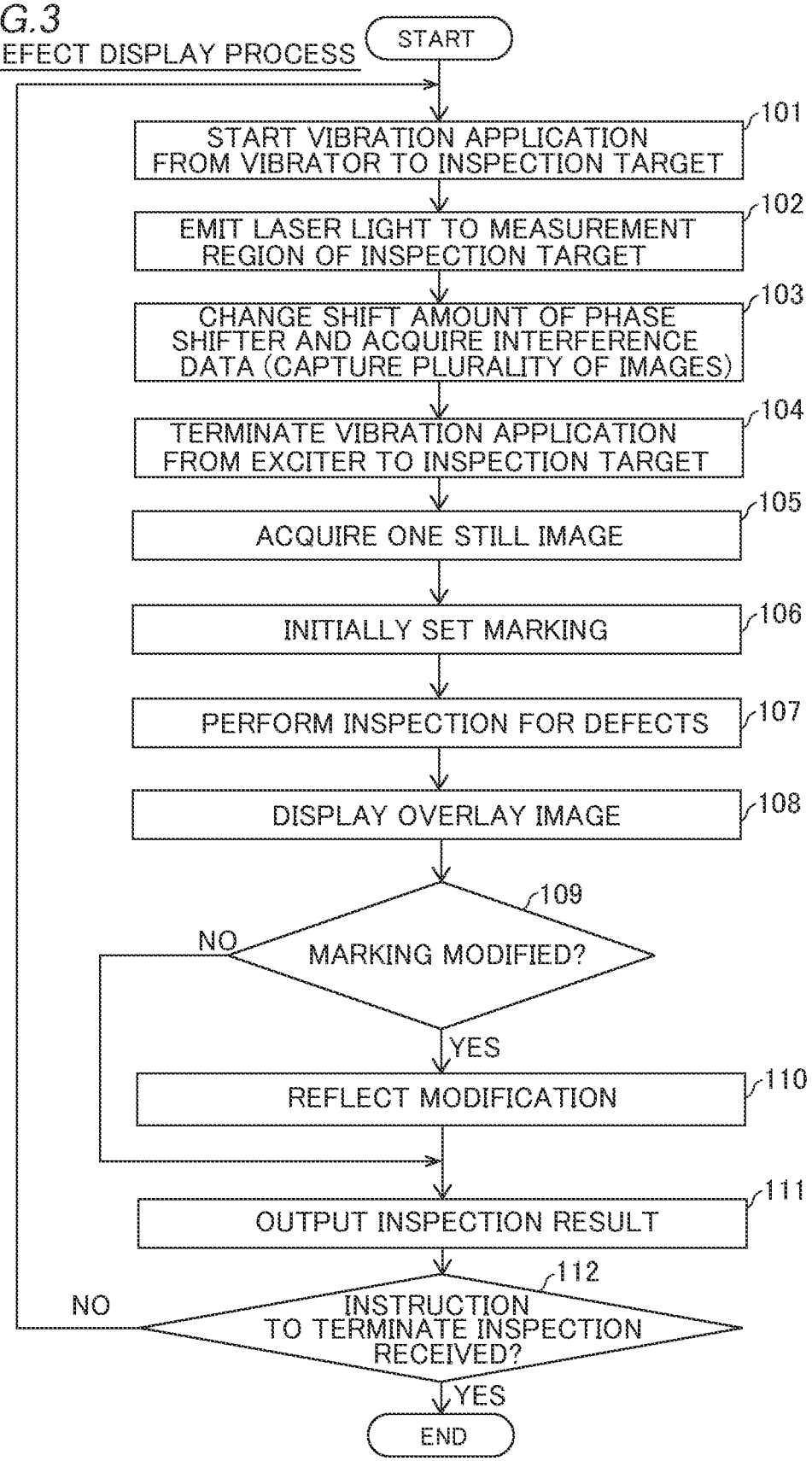

FIG.4 MOVING IMAGE
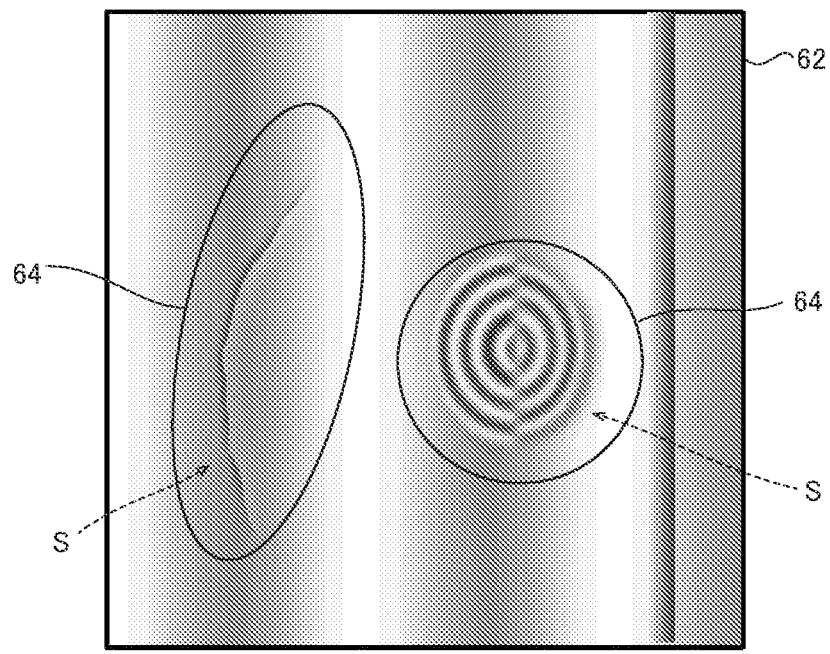
FIG.5 OVERLAY IMAGE
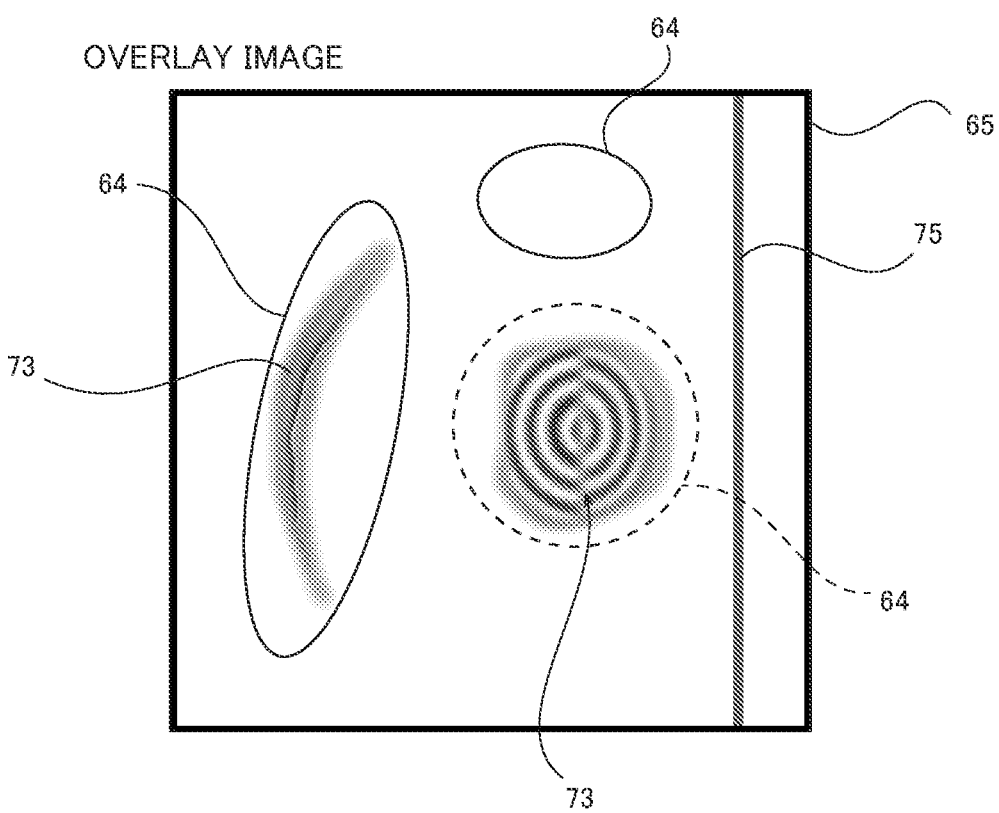

FIG.6 OVERLAY IMAGE
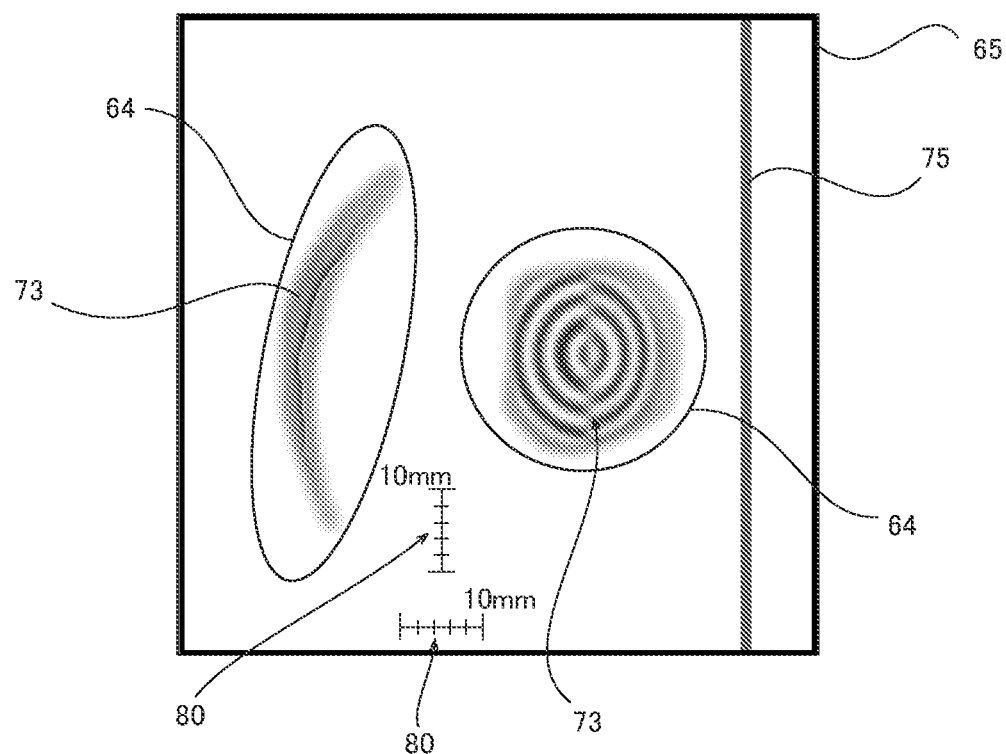
FIG.7
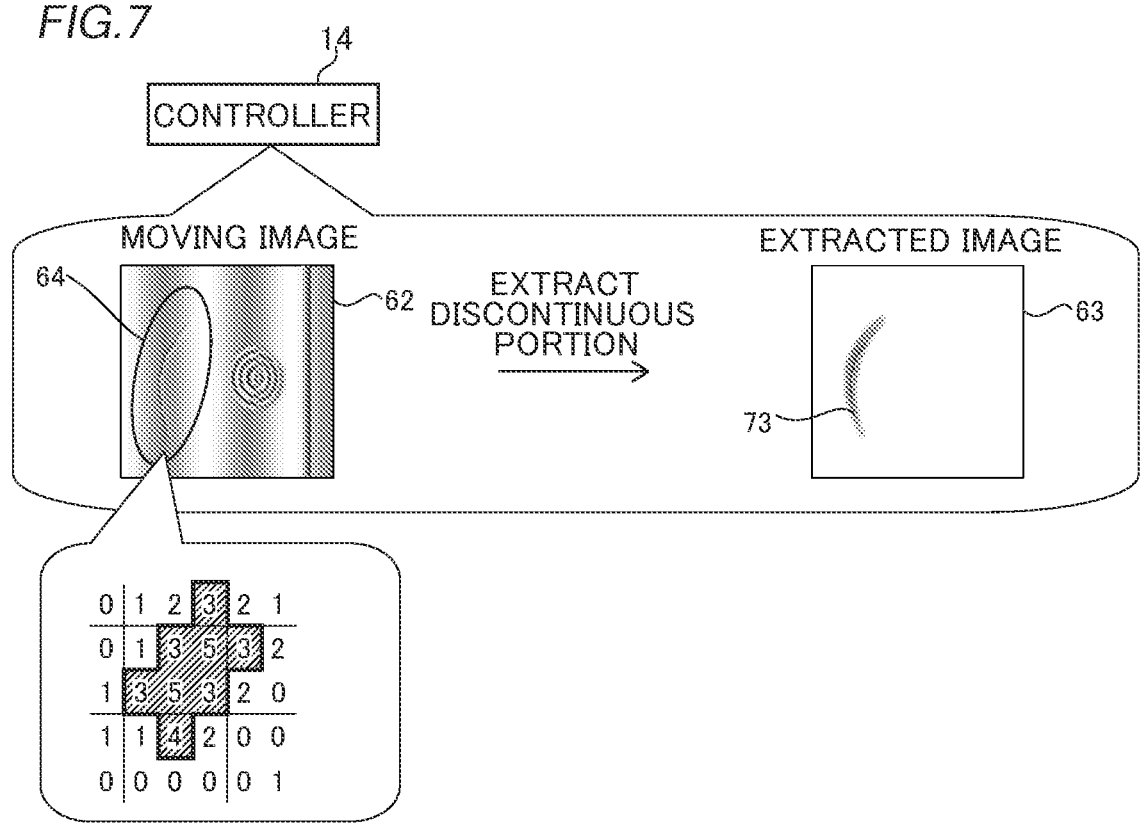

FIG.8 OVERLAY IMAGE

DEFECT INSPECTION APPARATUS

TECHNICAL FIELD

The present invention relates to a defect inspection apparatus, and more particularly, it relates to a defect inspection apparatus including an imager.

BACKGROUND ART

Conventionally, a defect inspection apparatus including an imager is known. Such a defect inspection apparatus is disclosed in Japanese Patent Laid-Open No. 2017-219318, for example.

A defect inspection apparatus described in Japanese Patent Laid-Open No. 2017-219318 includes an excitation unit that excites an elastic wave in an object to be inspected, an illumination unit that emits strobe illumination to a measurement region on a surface of the object to be inspected, and an interferometer including an image sensor that detects light reflected by the object to be inspected in an excited (vibrating) state and interfering with each other. A controller provided in the defect inspection apparatus performs a data process based on detection signals obtained from detection elements of the image sensor. A known image process is performed on an image obtained as a result of this data process such that a defect on the surface of the object to be inspected is detected.

PRIOR ART

Patent Document

Patent Document 1: Japanese Patent Laid-Open No. 2017-219318

SUMMARY OF THE INVENTION

Problem to be Solved by the Invention

In a conventional defect inspection apparatus as described in Japanese Patent Laid-Open No. 2017-219318, a non-defective portion (a step, for example) of the object to be inspected may appear on the image obtained as a result of the data process in a shape similar to a defect. In this case, a user needs to look at the image obtained as a result of the data process and determine whether or not a portion appearing on the displayed image is defective from the positional relationship between the displayed image and a region of interest (a region in which a defect is likely to occur, for example). For example, the user determines that the portion appearing on the displayed image is defective based on the portion appearing on the displayed image being in the region of interest. The position of the region of interest in the image obtained as a result of the data process needs to be read by the user themselves by looking at the image, and thus the read position of the region of interest may differ depending on the user. In this case, an image that is determined (identified) as containing a defect differs depending on the user, and thus a difference in an inspection result occurs depending on the user. Therefore, there is a demand for a defect inspection apparatus capable of reducing or preventing a difference in an inspection result occurring depending on a user.

The present invention is intended to solve the above problem. The present invention aims to provide a defect inspection apparatus capable of reducing or preventing a difference in an inspection result occurring depending on a user.

Means for Solving the Problem

In order to attain the aforementioned object, a defect inspection apparatus according to an aspect of the present invention includes an imager configured to image an inspection target, a display configured to display an image based on an image captured by the imager, and a controller configured or programmed to receive a setting of a marking in a predetermined region of interest on the image displayed on the display. The controller is configured or programmed to inspect the inspection target for a defect based on the image captured by the imager, and superimpose an image of the marking on a position corresponding to the predetermined region of interest in an image of an inspection result displayed on the display.

Effect of the Invention

In the defect inspection apparatus according to this aspect, as described above, the controller is configured or programmed to receive the setting of the marking in the predetermined region of interest on the image displayed on the display, and superimpose the image of the marking on the position corresponding to the predetermined region of interest in the image of the inspection result displayed on the display. Accordingly, the position of the marking in the image of the inspection result is the same even when a user who performs the inspection is different. Consequently, a defect is distinguished based on the position of the marking in the image of the inspection result such that a difference in the inspection result occurring depending on the user can be reduced or prevented.

BRIEF DESCRIPTION OF THE DRAWINGS

FIG. 2 is a diagram for illustrating the defect display of the defect inspection apparatus according to the first embodiment.

FIG. 3 is a flowchart for illustrating a defect display process performed by a controller of the defect inspection apparatus according to the first embodiment.

FIG. 4 is a diagram showing a moving image of the defect inspection apparatus according to the first embodiment, on which an image of a marking has been superimposed.

FIG. 5 is a diagram for illustrating a control in a case in which a modification (addition) has been made in data of the marking of the defect inspection apparatus according to the first embodiment.

FIG. 6 is a diagram showing a ruler used in the defect inspection apparatus according to the first embodiment.

FIG. 7 is a diagram for illustrating defect inspection of a defect inspection apparatus according to a second embodiment.

MODES FOR CARRYING OUT THE INVENTION

Embodiments embodying the present invention are hereinafter described on the basis of the drawings.

First Embodiment

The configuration of a defect inspection apparatus 100 according to a first embodiment is now described with reference to FIGS. 1 to 6.

Configuration of Defect Inspection Apparatus

The configuration of the defect inspection apparatus 100 according to the first embodiment is described with reference to FIG. 1. The defect inspection apparatus 100 is an apparatus that inspects an inspection target 7 for defects.

Figure 1:
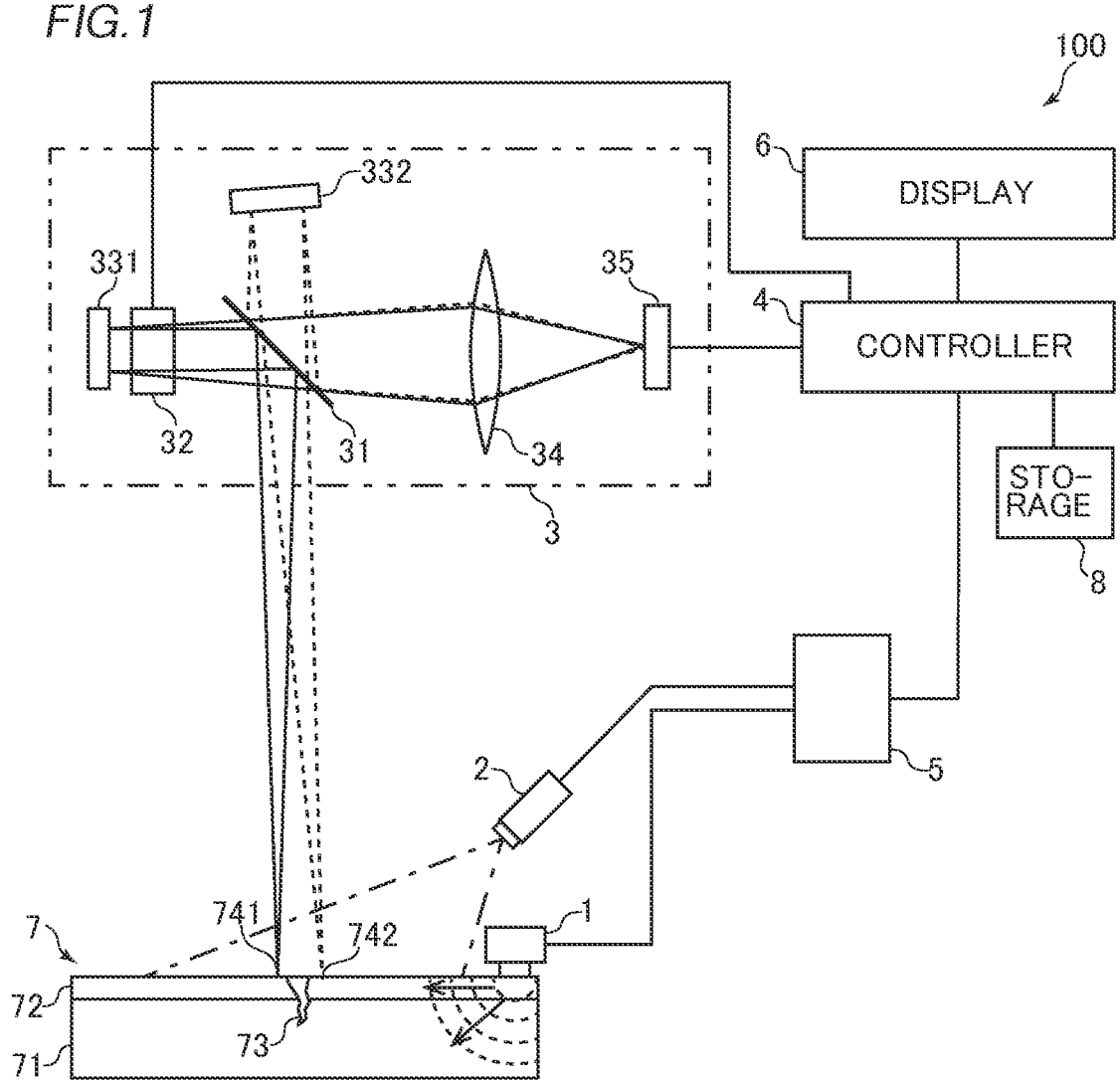
FIG. 1 is a block diagram showing the configuration of a defect inspection apparatus according to a first embodiment.

As shown in FIG. 1, the defect inspection apparatus 100 according to the first embodiment includes a vibrator 1, a laser illuminator 2, a speckle shearing interferometer 3, a controller 4, a signal generator 5, a display 6, and a storage 8. Although FIG. 1 illustrates that the controller 4, the display 6, and the storage 8 are provided separately from each other, the present invention is not limited to this. The controller 4, the display 6, and the storage 8 may be provided in a common terminal. The vibrator 1 and the speckle shearing interferometer 3 are examples of an "exciter" and an "interference unit" in the claims, respectively.

The vibrator 1 and the laser illuminator 2 are connected to the signal generator 5 via cables.

The vibrator 1 excites vibrations (sonic vibrations) in the inspection target 7. Specifically, the vibrator 1 is arranged so as to be in contact with the inspection target 7, and converts an AC electric signal from the signal generator 5 into mechanical vibrations to excite vibrations (sonic vibrations) in the inspection target 7. Note that the vibrator 1 excites ultrasonic vibrations in the inspection target 7.

The laser illuminator 2 emits laser light to the inspection target 7. The laser illuminator 2 includes a laser light source (not shown) and an illumination light lens. The illumination light lens diffuses and emits the laser light emitted from the laser light source to an entire measurement region on a surface of the inspection target 7. Furthermore, the laser illuminator 2 emits the laser light at the predetermined timing based on the electric signal from the signal generator 5. That is, the laser illuminator 2 emits the laser light to the inspection target 7 so as to correspond to the vibrations by the vibrator 1.

The speckle shearing interferometer 3 causes interference of reflected laser light arriving from different positions on the inspection target 7 excited by the vibrator 1. The speckle shearing interferometer 3 includes a beam splitter 31, a phase shifter 32, a first reflecting mirror 331, a second reflecting mirror 332, a condenser lens 34, and an image sensor 35. The image sensor 35 is an example of an "imager" in the claims.

The beam splitter 31 includes a half mirror. The beam splitter 31 is arranged at a position that the laser light reflected by the surface of the inspection target 7 enters. The beam splitter 31 reflects the incident laser light toward the phase shifter 32, and transmits the incident laser light toward the second reflecting mirror 332. Furthermore, the beam splitter 31 reflects the incident laser light reflected by the second reflecting mirror 332 toward the condenser lens 34, and transmits the incident laser light reflected by the first reflecting mirror 331 toward the condenser lens 34.

The first reflecting mirror 331 is arranged on the optical path of the laser light reflected by the beam splitter 31 at 45 degrees with respect to the reflective surface of the beam splitter 31. The first reflecting mirror 331 reflects the incident laser light reflected by the beam splitter 31 toward the beam splitter 31.

The second reflecting mirror 332 is arranged on the optical path of the laser light transmitted through the beam splitter 31 at an angle slightly inclined from the angle of 45 degrees with respect to the reflective surface of the beam splitter 31. The second reflecting mirror 332 reflects the incident laser light reflected by the beam splitter 31 toward the beam splitter 31.

The phase shifter 32 is arranged between the beam splitter 31 and the first reflecting mirror 331, and changes (shifts) the phase of the transmitted laser light under the control of the controller 4. Specifically, the phase shifter 32 changes the optical path length of the transmitted laser light.

The image sensor 35 includes a large number of detection elements, and is arranged on the optical paths of the laser light (a solid line in FIG. 1) reflected by the first reflecting mirror 331 after being reflected by the beam splitter 31 and transmitted through the beam splitter 31 and the laser light (a broken line in FIG. 1) reflected by the second reflecting mirror 332 after being transmitted through the beam splitter 31 and reflected by the beam splitter 31. The image sensor 35 includes a CMOS image sensor or a CCD image sensor, for example. The image sensor 35 images the incident laser light. The image sensor 35 also images the reflected laser light, the interference of which has been caused by the speckle shearing interferometer 3. Thus, the inspection target 7 is imaged by the image sensor 35.

The condenser lens 34 is arranged between the beam splitter 31 and the image sensor 35 and collects the laser light (the solid line in FIG. 1) transmitted through the beam splitter 31 and the laser light (the broken line in FIG. 1) reflected by the beam splitter 31.

The laser light (the solid line in FIG. 1) reflected at a position 741 on the surface of the inspection target 7 and by the first reflecting mirror 331 and the laser light (the broken line in FIG. 1) reflected at a position 742 on the surface of the inspection target 7 and by the second reflecting mirror 332 interfere with each other and enter the same portion of the image sensor 35. The position 741 and the position 742 are spaced apart from each other by a minute distance. Similarly, the reflected laser light arriving from different positions in each region of the inspection target 7 is guided by the speckle shearing interferometer 3 and enters the image sensor 35.

The controller 4 operates the phase shifter 32 arranged in the speckle shearing interferometer 3 with an actuator (not shown) to change the phase of the transmitted laser light. Thus, a phase difference between the laser light reflected at the position 741 and the laser light reflected at the position 742 changes. Each detection element of the image sensor 35 detects the intensity of interference light resulting from interference between these two rays of laser light.

The controller 4 controls the vibration of the vibrator 1 and the timing of the emission of the laser light by the laser illuminator 2 via the signal generator 5, and captures an image while changing the phase shift amount. The phase shift amount is changed by $\lambda/4$, and captures a total of thirty-seven images including thirty-two images for timings j (j=0 to 7) of laser emission at phase shift amounts (0, $\lambda/4$, λ/2, and 3λ/4) and five images when the laser illuminator 2 is off before and after the phase shift amounts (0, λ/4, λ/2, and 3λ/4). Note that λ is the wavelength of laser light.

The controller 4 processes a detection signal from each detection element according to the following procedure, and acquires a moving image 62 (see FIG. 2) representing the vibration state. The controller 4 measures the spatial distribution of the periodically changing physical quantity caused by the propagation of vibrations of the inspection target 7 based on the interfered reflected laser light imaged by the image sensor 35. For example, the controller 4 generates the moving image 62 (spatial distribution image) regarding the propagation of vibrations of the inspection target 7 based on the interfered reflected laser light imaged by the image sensor 35.

The controller 4 obtains an optical phase (a phase difference between two optical paths when the phase shift amount is zero) $\phi j$ by the following formula (1) from the luminance values $I_{j0}$ to $I_{j3}$ of the images (four sheets each) in which the timings j (j=0 to 7) of laser emission are the same and the phase shift amounts vary by λ/4.

$$\phi j = -\arctan\{(I_{j3}-I_{j1})/(I_{j2}-I_{j0})\} \quad (1)$$

Furthermore, the controller 4 performs a sine wave approximation on the optical phase $\phi j$ by a least-squares method to obtain approximation coefficients A, θ, and C in the following formula (2):

$$\phi j = A\cos(\theta+j\pi/4)+C = B\exp(j\pi/4)+C \quad (2)$$

where B represents a complex amplitude and is expressed by the following formula (3).

$$B = A\exp(i\theta): \text{complex amplitude} \quad (3)$$

Furthermore, the controller 4 generates and outputs the moving image 62 (30 to 60 frames) representing an optical phase change at each phase time $\xi$ ($0 \leq \xi < 2\pi$) of vibration from an approximation formula obtained by removing the constant term C from the formula (2). In the above process, a spatial filter is appropriately applied to the complex amplitude B in order to remove noise. Furthermore, the phase shift amount and the step of the laser emission timing (λ/4 and T/8, respectively in the above example where T represents a period of vibration) are not limited to these. In this case, the calculation formula is different from the above formulas (1) to (3).

The controller 4 applies the spatial filter and detects a discontinuous region of the vibration state as a defective portion 73 of the inspection target 7 from the moving image 62. That is, the controller 4 extracts the vibration discontinuous portion based on the spatial distribution of the physical quantities. Specifically, the controller 4 acquires an extracted image 63 in which the vibration discontinuous portion has been extracted from the moving image 62.

As shown in FIG. 2, the controller 4 acquires a still image 61 and the moving image 62 based on the interfered reflected laser light imaged by the image sensor 35. The still image 61 is an image representing the brightness of the light of the inspection target 7. The moving image 62 is an image representing the brightness of light and a phase fluctuation due to the ultrasonic vibrations of the inspection target 7. The moving image 62 is an example of an "image representing a vibration state of the inspection target" in the claims.

The controller 4 acquires one still image 61 based on a plurality of images 60 (still images) captured by the image sensor 35. Specifically, the controller 4 acquires one still image 61 by averaging the plurality of images 60 captured to generate the moving image 62 regarding the propagation of vibrations of the inspection target 7. In this still image 61, it is possible to identify a changed portion 75 in the structure of the inspection target 7. Although it is possible to confirm vibrations from the moving image 62 regarding the propagation of the vibrations of the inspection target 7, it is difficult to visually confirm the changed portion in the structure of the inspection target 7.

In the first embodiment, the controller 4 receives the setting of a marking 64 on the still image 61. The marking 64 include graphics and characters. The control of the controller 4 regarding the marking 64 is described below in detail.

The controller 4 performs a control to emphasize and superimpose the vibration discontinuous portion extracted from the moving image 62 on one still image 61 acquired by averaging. Thus, the controller 4 generates (acquires) an overlay image 65 in which the vibration discontinuous portion extracted from the moving image 62 has been superimposed on the still image 61 as an image of the inspection result. The overlay image 65 is an example of an "image of the inspection result based on the image representing the vibration state of the inspection target" in the claims.

The display 6 displays the still image 61, the moving image 62, and the overlay image 65. The display 6 includes a liquid crystal display or an organic EL display, for example. The still image 61 and the moving image 62 are examples of an "image based on an image captured by the imager" in the claims.

The inspection target 7 is a coated steel plate in which a coating film 72 (see FIG. 1) is applied on a surface of a steel plate 71. The defective portion 73 includes cracks, peeling, and lifts under the coating, for example. When the inspection target 7 is a dissimilar material bonded member, the defective portion 73 includes a defective bonding portion.

Defect Display Process

A defect display process by the defect inspection apparatus 100 according to the first embodiment is now described based on a flowchart with reference to FIG. 3. The defect display process is performed by the controller 4.

In step 101 of FIG. 3, vibration application from the vibrator 1 to the inspection target 7 is started. Thus, vibrations are excited in the inspection target 7. In step 102, laser light is emitted from the laser illuminator 2 to the measurement region of the inspection target 7.

In step 103, interference data is acquired while the shift amount of the phase shifter 32 is changed. That is, the plurality of images 60 (see FIG. 2) in which the phases are different from each other and interference has been performed are captured. Specifically, the phase shifter 32 of the speckle shearing interferometer 3 is operated such that the phase of the laser light changes by λ/4, and the intensity of the interference light of the laser light at each phase is detected (imaged) by the image sensor 35.

In step 104, the vibration application from the vibrator 1 to the inspection target 7 is terminated.

In step 105, one still image 61 (see FIG. 2) is acquired (generated) based on the plurality of images 60 acquired in step 103.

In step 106, the controller 4 receives the setting of the marking 64 in a predetermined region of interest S (a portion in which a defect is likely to occur, for example) on the still image 61 displayed on the display 6. Specifically, when a user inputs the marking 64 on the still image 61, the input marking 64 is set (initially set). That is, data of the marking 64 input on the still image 61 is stored in the storage 8 (see FIG. 1).

Then, in step 107, the controller 4 inspects the inspection target 7 for defects based on the images 60 captured by the image sensor 35. Specifically, first, the controller 4 acquires (generates) the moving image 62 (see FIG. 2) from the plurality of images 60. Next, the controller 4 extracts a vibration discontinuous portion from the moving image 62 (see FIG. 2). Then, the controller 4 acquires the overlay image 65 (see FIG. 2) in which the vibration discontinuous portion extracted from the moving image 62 (extracted image 63; see FIG. 2) has been superimposed on the still image 61 acquired in step 105.

In the first embodiment, the controller 4 stores, separately from the data of the marking 64 set in subsequent step 108, the data of the image of the inspection result on which the image of the marking 64 has not been superimposed (the overlay image 65 on which the marking 64 has not been superimposed) in the storage 8. Furthermore, for images other than the above image, image data obtained in the course of inspection can be stored in the storage 8. For example, data of the moving image 62, data of the still image 61, data of the extracted image 63, data of each of the plurality of images 60, etc. can be stored in the storage 8. The storage 8 also stores an image (see FIG. 5) in which the image of the marking 64 has been superimposed on the image of the inspection result.

Then, in step 108, the controller 4 displays the overlay image 65 acquired in step 107 on the display 6. In the first embodiment, the controller 4 superimposes the image of the marking 64 on a position corresponding to the predetermined region of interest S (see FIG. 2) in the overlay image 65 (the image of the inspection result) displayed on the display 6. That is, a control is performed such that a position (coordinates) on the inspection target 7 corresponding to a position in the overlay image 65 at which the marking 64 is arranged is the same as a position (coordinates) on the inspection target 7 corresponding to a position in the still image 61 at which the marking 64 is arranged. Furthermore, the controller 4 displays, on the display 6, the overlay image 65 on which the image of the marking 64 has been superimposed, using the data of the overlay image 65 and the data of the image of the marking 64 stored in the storage 8.

In the first embodiment, as shown in FIG. 4, the controller 4 superimposes the image of the marking 64 on a position corresponding to the predetermined region of interest S in the moving image 62. That is, a control is performed such that a position (coordinates) on the inspection target 7 corresponding to a position in the moving image 62 at which the marking 64 is arranged is the same as the position (coordinates) on the inspection target 7 corresponding to the position in the still image 61 at which the marking 64 is arranged. Furthermore, the controller 4 displays, on the display 6, the moving image 62 on which the image of the marking 64 has been superimposed, using the data of the moving image 62 and the data of the marking 64 stored in the storage 8. In the moving image 62, the defective portion 73 (discontinuous portion) is more likely to clearly appear than in the overlay image 65. Therefore, the marking 64 can be superimposed on the moving image 62 in addition to the overlay image 65 such that the moving image 62 can be used when it is difficult to distinguish the defective portion 73 in the overlay image 65, and thus it becomes possible to easily distinguish the defective portion 73.

The controller 4 can superimpose a ruler 80 (see FIG. 6) on the overlay image 65. Thus, the user can easily know (measure) the size of the defective portion 73 on the overlay image 65, using the ruler 80. Although the overlay image 65 is shown as an example in FIG. 6, the ruler 80 may appear on the moving image 62 or the extracted image 63.

Then, in step 109, it is determined whether or not the user has modified (including added) the data of the marking 64 on the overlay image 65 (moving image 62). For example, it is assumed that the data of the marking 64 has been modified (added) by the user when the position of the image of the marking 64 and the position of the image of the defective portion 73 are shifted from each other in the overlay image 65 (moving image 62), as shown in FIG. 5. In an example shown in FIG. 5, the position of the upper right marking 64 and the position of the defective portion 73 are shifted from each other. In this example, a modification (addition) has been made such that the marking 64 (broken line) surrounding the defective portion 73 is arranged. An example of modification (addition) of the data of the marking 64 is not limited to this.

When the modification (addition) of the data of the marking 64 on the overlay image 65 (moving image 62) is received by the controller 4, the process advances to step 110. When the correction (addition) of the data of the marking 64 on the overlay image 65 (moving image 62) is not received (i.e., when the user has not made a modification (addition)), the process advances to step 111.

In the first embodiment, in step 110, the controller 4 reflects the modification (addition) of the data of the marking 64 in the data of the set marking 64. Specifically, the modification (addition) is reflected in the data of the marking 64 stored in the storage 8.

When the data of the marking 64 has been modified (added), the controller 4 displays the color of the modified (added) marking 64 (the marking 64 indicated by a broken line in FIG. 5) in a color different from the color of the original marking 64 (the marking 64 indicated by a solid line in FIG. 5).

Then, in step 111, the inspection result is output. Specifically, an image in which the image of the marking 64 has been superimposed on the overlay image 65 (moving image 62) is output as data (a bitmap file or a moving image file). At this time, data of an image in which an image based on the data of the marking 64 in which the modification (addition) has been reflected in step 110 has been superimposed on the overlay image 65 (moving image 62) is output. Data of an image in which an image based on the data of the marking 64 before reflection of the modification (addition) has been superimposed on the overlay image 65 (moving image 62) may be output.

The moving image 62 (before marking superimposing) acquired in step 107, the overlay image 65 (before marking superimposing) acquired in step 108, the still image 61 acquired in step 105, the image of only the marking 64, and the plurality of images 60 acquired in step 103, for example, can also be individually output.

Then, in step 112, the controller 4 terminates the inspection in response to the user inputting an instruction to terminate the inspection, for example. When the inspection is to be continued, the process returns to step 101.

In the first embodiment, the controller 4 repeatedly uses the data of the marking 64 stored in the storage 8 for each different inspection. In other words, the data of the marking 64 set in the first inspection is also diverted (used) in subsequent inspections (defect display process). Thus, the step of initially setting the marking 64 (step 106) is omitted in the second and subsequent inspections.

Specifically, the controller 4 performs the current inspection while reading the data of the marking 64 stored in the storage 8 in the first inspection when inspecting a plurality of inspection targets 7 of the same type individually or when inspecting the same inspection target 7 a plurality of times. In this case, the controller 4 superimposes the image of the read marking 64 on the position corresponding to the predetermined region of interest S in the image (the overlay image 65 or the moving image 62) of the current inspection result. When the data of the marking 64 has been modified (added) by the previous inspection, the user can select which of the data of the marking 64 in which the modification (addition) has been reflected and the data of the marking 64 before reflection of the modification (addition) (i.e., the data of the first marking 64) is to be superimposed on the image of the inspection result.

In step 106, the controller 4 may determine whether or not the setting of the marking 64 has been completed. With this configuration, in the first inspection, it is determined that the setting of the marking 64 has not been completed, and in the second and subsequent inspections, it is determined that the setting of the marking 64 has been completed. When determining that the setting of the marking 64 has not been completed, the controller 4 may notify the user that the setting of the marking 64 has not been completed (display an indication that the setting of the marking 64 has not been completed on the display 6, for example). On the other hand, when determining that the setting of the marking 64 has been completed, the controller 4 may automatically read the data of the marking 64 stored in the storage 8 (without an instruction input from the user). It is necessary to adjust the orientation and the imaging range, for example, of the inspection target 7 set in the defect inspection apparatus 100 to be the same as each other in different inspections.

Advantages of First Embodiment

In the first embodiment, the following advantages are obtained.

In the first embodiment, as described above, the controller 4 is configured or programmed to inspect the inspection target 7 for defects based on the image captured by the image sensor 35 (imager), and superimpose the image of the marking 64 on the position corresponding to the predetermined region of interest S in the overlay image 65 (the image of the inspection result) displayed on the display 6. Accordingly, the position of the marking 64 in the overlay image 65 is the same even when the user who performs the inspection is different. Consequently, a defect is distinguished based on the position of the marking 64 in the overlay image 65 such that a difference in the inspection result occurring depending on the user can be reduced or prevented.

The defect inspection apparatus according to the first embodiment is configured as follows such that the following advantages are further obtained.

In the first embodiment, as described above, the defect inspection apparatus 100 includes the vibrator 1 (exciter) configured to excite sonic vibrations in the inspection target 7, the laser illuminator 2 configured to emit laser light to the inspection target 7, and the speckle shearing interferometer 3 (interference unit) configured to cause interference of reflected laser light arriving from different positions on the inspection target 7 excited by the vibrator 1. The image sensor 35 (imager) is configured to image the interfered reflected laser light. Furthermore, the controller 4 is configured or programmed to acquire the image representing the vibration state of the inspection target 7 based on the interfered reflected laser light imaged by the image sensor 35, and superimpose the image of the marking 64 on the position corresponding to the predetermined region of interest S in the overlay image 65 (the image of the inspection result) based on the image representing the vibration state of the inspection target 7. When the inspection is performed based on the image representing the vibration state of the inspection target 7, the luminance of the laser light emitted to the inspection target 7 by the laser illuminator 2 may be uneven. Due to this, a defect-like display may appear in a portion in which the amount of light is relatively low. Thus, when the inspection is performed based on the image representing the vibration state of the inspection target 7, a relatively high degree of skill is required to distinguish a defect. Therefore, reducing or preventing a difference in the inspection result depending on the user by superimposing the image of the marking 64 on the position corresponding to the predetermined region of interest S in the overlay image 65 is particularly effective when the inspection is performed based on the image representing the vibration state of the inspection target 7.

In the first embodiment, as described above, the controller 4 is configured or programmed to superimpose the image of the marking 64 on the position corresponding to the predetermined region of interest S in the overlay image 65 (the image of the inspection result) acquired using the still image 61 and the moving image 62 based on the image captured by the image sensor 35 (imager). Accordingly, a defect can be distinguished based on the position of the marking 64 in the overlay image 65 acquired using the still image 61 and the moving image 62. Consequently, when the user visually recognizes the overlay image 65 and distinguishes (identifies) a defect, a difference in the inspection result occurring depending on the user can be reduced or prevented.

In the first embodiment, as described above, the controller 4 is configured or programmed to acquire the still image 61 representing the brightness of the light of the inspection target 7 and the moving image 62 representing the vibration state of the inspection target 7 based on the interfered reflected laser light imaged by the image sensor 35 (imager), and acquire the overlay image 65 in which the vibration discontinuous portion extracted from the moving image 62 has been superimposed on the still image 61 as the image of the inspection result. Furthermore, the controller 4 is configured or programmed to receive the setting of the marking 64 in the predetermined region of interest S on the still image 61 displayed on the display 6, and superimpose the image of the marking 64 on the position corresponding to the predetermined region of interest S in the overlay image 65. Accordingly, when the user visually recognizes the overlay image 65 in which the discontinuous portion extracted from the moving image 62 has been superimposed on the still image 61 and distinguishes (identifies) a defect, a difference in the inspection result occurring depending on the user can be reduced or prevented.

In the first embodiment, as described above, the controller 4 is configured or programmed to superimpose the image of the marking 64 on the position corresponding to the predetermined region of interest S in the moving image 62. Accordingly, when the user visually recognizes the moving image 62 and distinguishes (identifies) a defect, a difference in the inspection result occurring depending on the user can be reduced or prevented.

In the first embodiment, as described above, the defect inspection apparatus 100 includes the storage 8 configured to store the data of the set marking 64. The controller 4 is configured or programmed to repeatedly use the data of the marking 64 stored in the storage 8 for each different inspection. Accordingly, it is not necessary to set the marking 64 for each different inspection. For example, the time and effort required to search for the predetermined region of interest S while referring to a specification or the like for each inspection can be saved. Consequently, when a plurality of inspections are performed, the time required for inspection can be shortened.

In the first embodiment, as described above, the controller 4 is configured or programmed to, when inspecting the plurality of inspection targets 7 of the same type individually or when inspecting the same inspection target 7 a plurality of times, perform the current inspection of the inspection target 7 for defects while reading the data of the marking 64 stored in the storage 8 in the first inspection of the inspection target 7, and superimpose the image of the read marking 64 on the position corresponding to the predetermined region of interest S in the current overlay image 65 (the image of the inspection result). Accordingly, when the marking 64 is set only in the first inspection, the step of setting the marking 64 in subsequent inspections can be omitted. Consequently, the time required for the inspection can be further shortened when the inspection is performed a plurality of times.

In the first embodiment, as described above, separately from the data of the marking 64, the data of the overlay image 65 (the image of the inspection result) is stored in the storage 8 before the image of the marking 64 is superimposed thereon. Accordingly, an operation to individually handle the image of the marking 64 and the overlay image 65 on which the image of the marking 64 has not been superimposed (individually post each image in a report, for example) can be efficiently performed.

In the first embodiment, as described above, the controller 4 is configured or programmed to reflect the modification of the data of the marking 64 in the data of the set marking 64 when receiving the modification of the data of the marking 64 on the overlay image 65 (the image of the inspection result). Accordingly, when the image of the marking 64 is superimposed on the overlay image 65 in another inspection of the inspection target 7 after the data of the marking 64 is modified, the image of the modified marking 64 can be superimposed on the overlay image 65.

Second Embodiment

In the second embodiment, an inspection target region can be limited to a portion of an imaging range displayed on a display 6, unlike the first embodiment in which inspection is performed over the entire imaging range displayed on the display 6.

Specifically, as shown in FIG. 7, when an image of a marking 64 surrounding a certain range is superimposed on an image for inspection (a moving image 62 in an example shown in FIG. 7), a controller 14 excludes a region outside the certain range from the inspection target region and detects (extracts) a defect within the certain range. That is, only a discontinuous portion within the range of the marking 64 appears (is extracted) in an extracted image 63. Thus, the controller 14 has a function (inspection range trimming function) of extracting (trimming) only a range to be inspected from the entire imaging range.

The controller 14 detects a defect based on the degree of brightness of each pixel in an image 60 captured by an image sensor 35. In the second embodiment, the controller 14 detects a defect based on the luminance value of each pixel. The controller 14 has a function (threshold comparison function) of detecting a defect based on a comparison between the luminance value of each pixel (the degree of brightness of each pixel) and a threshold.

In the second embodiment, as shown in FIG. 7, the controller 14 detects a portion having a luminance value equal to or greater than the predetermined threshold within the certain range (the range of the marking 64) as a defect (discontinuous portion). Specifically, the controller 14 detects the magnitude (six levels from 0 to 5, for example) of the luminance value of each pixel (detection element) within the range of the marking 64. Then, the controller 14 detects (extracts) pixels (detection elements) each having a luminance value equal to or greater than the predetermined threshold (3 or more, for example) as pixels (detection elements) having a defect (discontinuous portion). FIG. 7 schematically illustrates the distribution of luminance values.

The controller 14 also can detect (extract) a defect in the entire imaging range displayed on the display 6 based on the comparison between the luminance value of each pixel (the degree of brightness of each pixel) and the threshold. That is, the controller 14 can switch a range (inspection range) in which a defect is detected (extracted) based on the comparison between the luminance value of each pixel (the degree of brightness of each pixel) and the threshold between the entire imaging range and the certain range (the range of the marking 64). The controller 14 may detect (extract) a defect in the range of each of a plurality of markings 64 based on the comparison between the luminance value of each pixel (the degree of brightness of each pixel) and the threshold.

The controller 14 has a function (proportion determination function) of determining the state of an inspection target 7 (passing/failing of an inspection result) based on the proportion of pixels corresponding to a defect detected in the image 60 captured by the image sensor 35. The controller 14 determines whether or not a defect exceeding a preset criterion (predetermined proportion) exists in the inspection range of the inspection target 7.

In the second embodiment, the controller 14 determines the state of the inspection target 7 (passing/failing of the inspection result) based on the proportion of pixels corresponding to a defect detected within the certain range (the range of the marking 64). In the second embodiment, the controller 14 has a function of determining the state of the inspection target 7 based on the proportion of pixels corresponding to a defective portion in the inspection range extracted (trimmed) from the entire imaging range by the inspection range trimming function (a portion detected as a defect in the inspection range extracted from the entire imaging range). Specifically, whether the state of the inspection target 7 is good or bad (passing/failing of the inspection result) is determined based on the proportion of the number of pixels in a portion (defective portion) detected as a defect by the threshold comparison function to the number of pixels in the inspection range extracted (trimmed) by the inspection range trimming function.

The controller 14 can determine the state of the inspection target 7 based on the proportion of the number of pixels in the defective portion (the portion detected as a defect by the threshold comparison function) to the number of pixels in the entire imaging range. That is, in the proportion determination function, the controller 14 can switch the number of pixels to be compared with the number of pixels in the defective portion (the portion detected as a defect by the threshold comparison function) between the number of pixels in the entire imaging range and the number of pixels in the certain range (the range of the marking 64).

Figure 8:
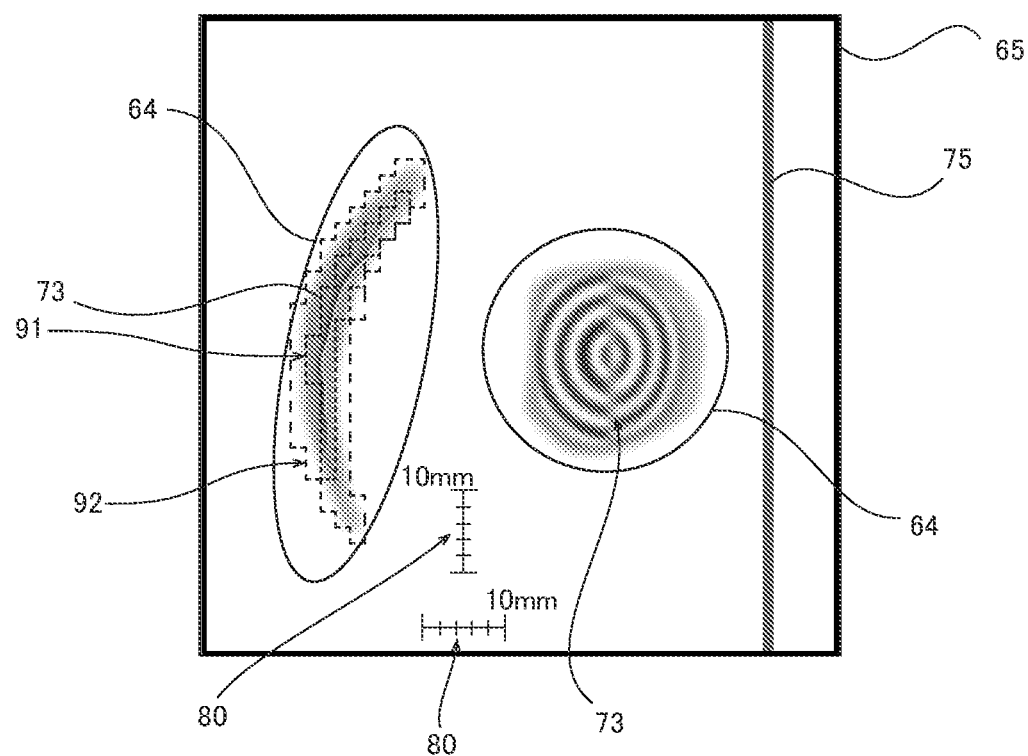
FIG. 8 is a diagram showing an example of an overlay image according to the second embodiment.

The controller 14 superimposes information based on the luminance value corresponding to the degree of brightness of each pixel in the image 60 captured by the image sensor 35 on an overlay image 65 (an image of the inspection result). Specifically, as shown in FIG. 8, defective regions 91 and 92 (regions indicated by broken lines) based on the degree of brightness (luminance value) of each pixel are superimposed on the image of the inspection result. The defective regions 91 and 92 are examples of "information based on the luminance value" in the claims. For example, the defective region 91 has a luminance value of 4 or more, and the defective region 92 has a luminance value of 3 or more. The controller 14 may visualize changes in the degree of brightness (luminance value) of each pixel using colors as in a heat map, and superimpose the changes on the overlay image 65 (the image of the inspection result). That is, the changes in the degree of brightness (luminance value) of each pixel may be displayed by a change in color (a change in shade) and superimposed on the overlay image 65 (the image of the inspection result). A value (numerical value) based on the luminance value may be superimposed on the overlay image 65 (the image of the inspection result). For example, the luminance values of pixels having luminance values (see FIG. 7) equal to or greater than the predetermined threshold may be superimposed on the overlay image 65 (the image of the inspection result) and displayed.

The remaining configurations of the second embodiment are similar to those of the first embodiment.

Advantages of Second Embodiment

In the second embodiment, the following advantages are obtained.

In the second embodiment, similarly to the first embodiment described above, a difference in the inspection result occurring depending on a user can be reduced or prevented.

The defect inspection apparatus according to the second embodiment is configured as follows such that the following advantages are further obtained.

In the second embodiment, as described above, the controller 14 is configured or programmed to detect a defect based on the degree of brightness (luminance value) of each pixel in the image captured by the image sensor 35 (imager). Accordingly, the controller 14 can automatically detect a defect based on the degree of brightness (luminance value) of each pixel in the image captured by the image sensor 35 (imager). Consequently, unlike a case in which the user visually recognizes and determines (identifies) a defect, a difference in the inspection result occurring depending on the user can be reduced or prevented.

In the second embodiment, as described above, the controller 14 is configured or programmed to determine the state of the inspection target 7 based on the proportion of pixels corresponding to a defect detected in the image captured by the image sensor 35 (imager). Accordingly, whether the state of the inspection target 7 is good or bad can be acquired from the proportion of the defect in the inspection range. Moreover, the user can take measures for the inspection target 7 when the proportion of the defect in the inspection range is high.

In the second embodiment, as described above, the controller 14 is configured or programmed to superimpose the information based on the luminance value corresponding to the degree of brightness of each pixel in the image 60 captured by the image sensor 35 (imager) on the overlay image 65 (the image of the inspection result). Accordingly, the user can visually recognize and confirm the information based on the luminance value, and thus a change in the luminance value within the inspection range can be easily known.

In the second embodiment, as described above, the controller 14 is configured or programmed to, when the image of the marking 64 surrounding the certain range is superimposed on the image for inspection (moving image 62), exclude the region outside the certain range from the inspection target region and detect (extract) a defect within the certain range. Accordingly, the inspection outside the range of the marking 64 is omitted, and thus the load on the controller 14 can be reduced.

In the second embodiment, as described above, the controller 14 is configured or programmed to detect the portion within the certain range (the range of the marking 64) having a luminance value that corresponds to the degree of brightness of each pixel in the image 60 captured by the image sensor 35 (imager) and is equal to or greater than the predetermined threshold, as a defect (discontinuous portion). Accordingly, a defect within the range of the marking 64 can be more reliably detected as compared with a case in which the defect is visually recognized and confirmed by the user.

In the second embodiment, as described above, the controller 14 is configured or programmed to determine the state of the inspection target 7 based on the proportion of pixels corresponding to a defect (discontinuous portion) detected within the certain range (the range of the marking 64). Accordingly, the state of the inspection target 7 can be determined based on the proportion of pixels corresponding to a defect (discontinuous portion) in an arbitrary range within the imaging range. Consequently, even when a changed portion 75 or the like in the structure of the inspection target 7 is detected as a defect, a portion (non-defective portion) that should not be included as a defect, such as the changed portions 75 in the structure of the inspection target 7, can be excluded from a range that passes or fails the inspection result of the inspection target 7. Thus, the state of the inspection target 7 can be more accurately determined.

The remaining advantages of the second embodiment are similar to those of the first embodiment.

At least portions of the configurations of the first and second embodiments may be combined.

Modified Examples

The embodiments disclosed this time must be considered as illustrative in all points and not restrictive. The scope of the present invention is not shown by the above description of the embodiments but by the scope of claims for patent, and all modifications (modified examples) within the meaning and scope equivalent to the scope of claims for patent are further included.

For example, while the example in which the image of the inspection result (such as the overlay image 65) is displayed only on the display 6 has been shown in the aforementioned embodiments, the present invention is not limited to this. For example, in the present invention, the image of the inspection result may be projected onto the surface of the inspection target 7.

Figure 9:
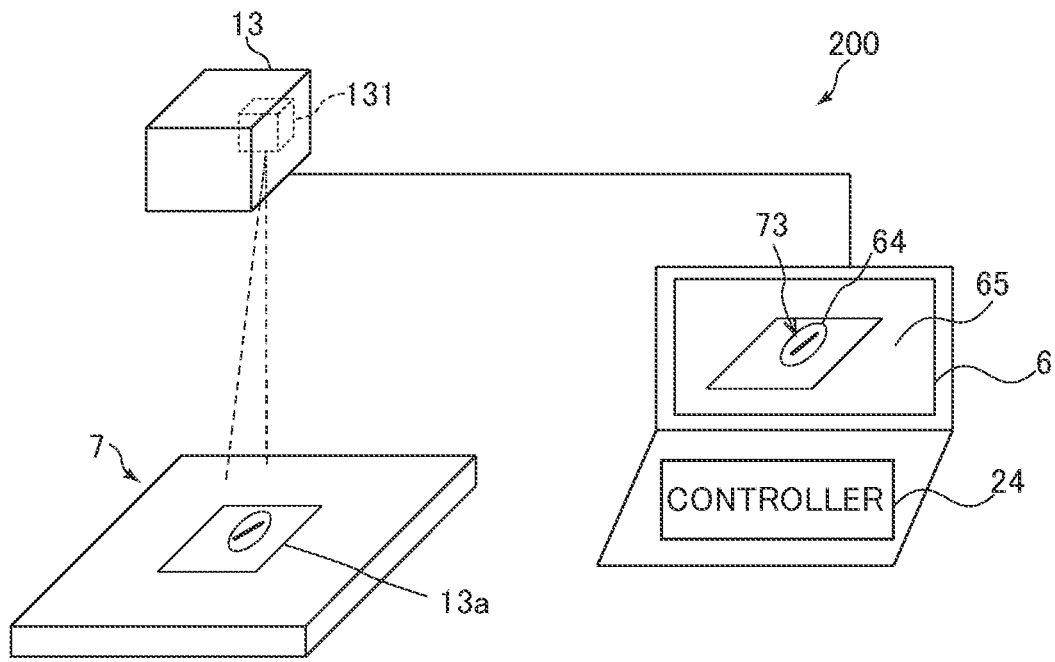
FIG. 9 is a diagram showing image projection onto an inspection target of a defect inspection apparatus according to a modified example of the first and second embodiments.

Specifically, as shown in FIG. 9, a defect inspection apparatus 200 includes a projector 131 that projects an image of an inspection result (overlay image 65) on which an image of a marking 64 has been superimposed onto an inspection target 7. The projector 131 is provided in a speckle shearing interferometer 13 provided in the defect inspection apparatus 200. The projector 131 may be provided separately from the speckle shearing interferometer 13. The speckle shearing interferometer 13 is an example of an "interference unit" in the claims.

In an example shown in FIG. 9, a projection image 13*a* of the image of the inspection result (overlay image 65) is projected onto the inspection target 7. Thus, the position of a defective portion 73 (in particular, a defect such as an internal defect that cannot be directly visually recognized) displayed on a display 6 and the position of the marking 64 on the actual inspection target 7 can be easily known based on the projection image 13*a*. The projector 131 is controlled such that the projection image 13*a* is actual size.

While the example in which the ruler 80 is used has been shown in the aforementioned embodiments, the present invention is not limited to this. For example, a three-dimensional measuring instrument may be used to measure the size of a defect.

Figure 10:
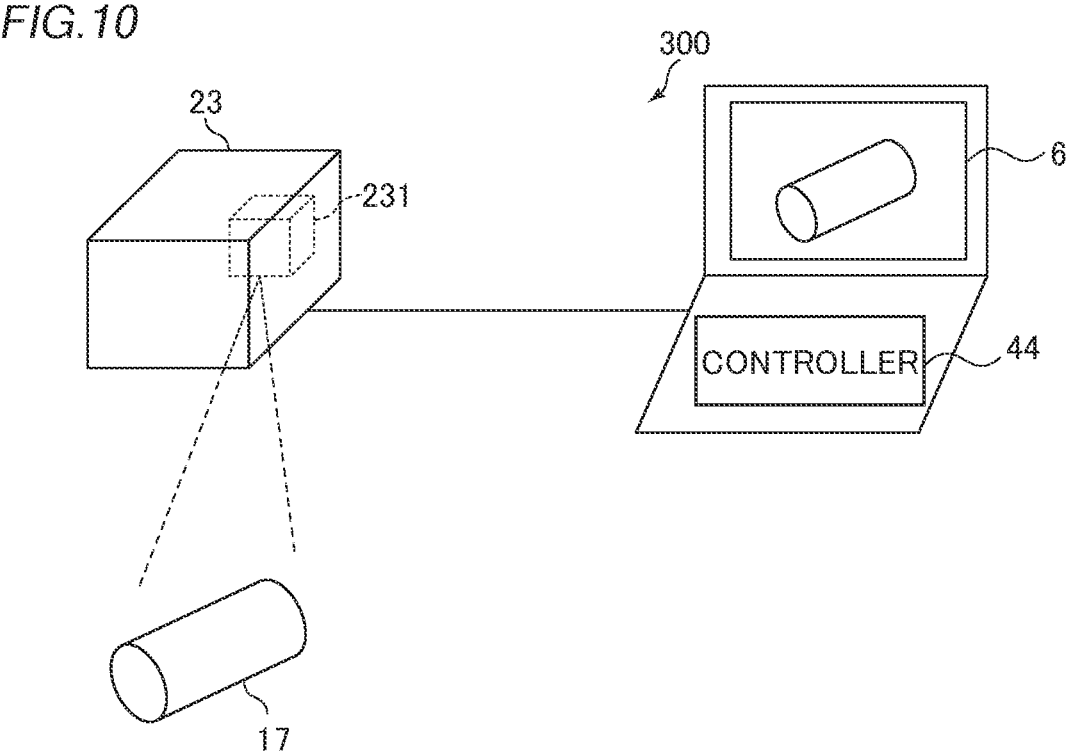
FIG. 10 is a diagram showing a defect inspection apparatus that performs three-dimensional measurement according to a reference example of the first and second embodiments.

Specifically, as shown in FIG. 10, a defect inspection apparatus 300 includes a three-dimensional measuring instrument 231. The three-dimensional measuring instrument 231 is provided in a speckle shearing interferometer 23 provided in the defect inspection apparatus 300. The three-dimensional measuring instrument 231 may be provided separately from the speckle shearing interferometer 23.

In this case, three-dimensional data of an inspection target 17 measured by the three-dimensional measuring instrument 231 is transmitted to a controller 44.

Figure 11:
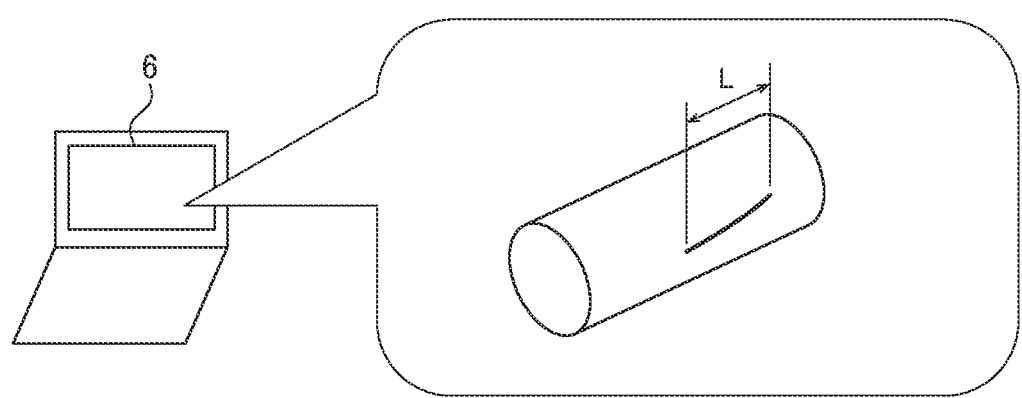
FIG. 11 is a diagram showing an image displayed on the defect inspection apparatus that performs three-dimensional measurement according to the reference example of the first and second embodiments.

The controller 44 extracts a defect by a method described in the above embodiments, for example. Then, the controller 44 displays an image (see FIG. 11) in which an image of the defect has been superimposed on a three-dimensional image of the inspection target 17 on a display 6. The controller 44 can calculate the length L of a defective portion in the three-dimensional image displayed on the display 6 based on the acquired three-dimensional data, for example. Thus, even when the inspection target has a three-dimensional and complex shape, the size of the defect can be easily calculated. Moreover, it is not necessary to use a ruler or the like, and thus an operation to measure the size of the defect can be simplified.

While the example in which the marking 64 is set on the still image 61 has been shown in the aforementioned embodiments, the present invention is not limited to this. For example, the marking 64 may be set on (at least some of) the plurality of images 60. In this case, an overlay image may be generated by superimposing, on the extracted image 63, the images 60 on which the marking 64 has been set.

While the example in which a defect inspection by ultrasonic vibration (flaw detection) is performed has been shown in the aforementioned embodiments, the present invention is not limited to this. For example, a magnetic defect inspection (magnetic flaw detection) may be performed. Alternatively, a defect inspection may be performed by sonic vibration other than ultrasonic vibration. In addition to the above, the technique of the present invention can be applied to any method for inspecting a defect using an image.

While the example in which the overlay image 65 is the image of the inspection result has been shown in the aforementioned embodiments, the present invention is not limited to this. For example, the moving image 62 and the extracted image 63 may be images of the inspection result.

While the example in which the user determines whether or not the position of the defective portion 73 and the position of the marking 64 are shifted from each other has been shown in the aforementioned embodiments, the present invention is not limited to this. The controller may use AI or the like to determine whether or not the position of the defective portion 73 and the position of the marking 64 are shifted from each other.

While the example in which a graphic (such as a circle) is displayed (set) as the marking 64 has been shown in the aforementioned embodiments, the present invention is not limited to this. For example, characters may be displayed (set) as the marking.

While the process operations of the controller are described using a flowchart in a flow-driven manner in which processes are performed in order along a process flow for the convenience of illustration in the aforementioned embodiments, the present invention is not limited to this. In the present invention, the process operations of the controller may be performed in an event-driven manner in which the processes are performed on an event basis. In this case, the process operations may be performed in a complete event-driven manner or in a combination of an event-driven manner and a flow-driven manner.

While the example in which the controller 14 can switch the range (inspection range) in which a defect is detected (extracted) based on the comparison between the luminance value of each pixel (the degree of brightness of each pixel) and the threshold between the entire imaging range and the certain range (the range of the marking 64) has been shown in the aforementioned second embodiment, the present invention is not limited to this. In the present invention, the controller may detect (extract) a defect based on the comparison between the luminance value of each pixel (the degree of brightness of each pixel) and the threshold in only one of the entire imaging range and the certain range (the range of the marking 64).

While the example in which in the proportion determination function, the controller 14 can switch the number of pixels to be compared with the number of pixels in the portion detected as a defect by the threshold comparison function (defective portion) between the number of pixels in the entire imaging range and the number of pixels in the certain range (the range of the marking 64) has been shown in the aforementioned second embodiment, the present invention is not limited to this. In the present invention, in the proportion determination function, the controller may set the number of pixels to be compared with the number of pixels in the portion (defective portion) detected as a defect by the threshold comparison function to only one of the number of pixels in the entire imaging range and the number of pixels in the certain range (the range of the marking 64).

Aspects

It will be appreciated by those skilled in the art that the exemplary embodiments described above are specific examples of the following aspects.

(Item 1)

A defect inspection apparatus comprising:

an imager configured to image an inspection target;

a display configured to display an image based on an image captured by the imager; and a controller configured or programmed to receive a setting of a marking in a predetermined region of interest on the image displayed on the display; wherein the controller is configured or programmed to inspect the inspection target for a defect based on the image captured by the imager, and superimpose an image of the marking on a position corresponding to the predetermined region of interest in an image of an inspection result displayed on the display.

(Item 2)

The defect inspection apparatus according to item 1, further comprising:
- an exciter configured to excite a sonic vibration in the inspection target;
- a laser illuminator configured to emit laser light to the inspection target; and
- an interference unit configured to cause interference of reflected laser light arriving from different positions on the inspection target excited by the exciter; wherein
- the imager is configured to image interfered reflected laser light; and
- the controller is configured or programmed to acquire an image representing a vibration state of the inspection target based on the interfered reflected laser light imaged by the imager, and superimpose the image of the marking on the position corresponding to the predetermined region of interest in the image of the inspection result based on the image representing the vibration state of the inspection target.

(Item 3)

The defect inspection apparatus according to item 1 or 2, wherein the controller is configured or programmed to superimpose the image of the marking on the position corresponding to the predetermined region of interest in the image of the inspection result acquired using a still image and a moving image based on the image captured by the imager.

(Item 4)

The defect inspection apparatus according to item 3, comprising:
- an exciter configured to excite a sonic vibration in the inspection target;
- a laser illuminator configured to emit laser light to the inspection target; and
- an interference unit configured to cause interference of reflected laser light arriving from different positions on the inspection target excited by the exciter; wherein
- the imager is configured to image interfered reflected laser light;
- the controller is configured or programmed to acquire the still image representing brightness of light of the inspection target and the moving image representing a vibration state of the inspection target based on the interfered reflected laser light imaged by the imager, and acquire an overlay image in which a vibration discontinuous portion extracted from the moving image has been superimposed on the still image as the image of the inspection result; and
- the controller is configured or programmed to receive the setting of the marking in the predetermined region of interest on the still image displayed on the display, and superimpose the image of the marking on a position corresponding to the predetermined region of interest in the overlay image.

(Item 5)

The defect inspection apparatus according to item 3 or 4, wherein the controller is configured or programmed to superimpose the image of the marking on a position corresponding to the predetermined region of interest in the moving image.

(Item 6)

The defect inspection apparatus according to any one of items 1 to 5, further comprising:
- a storage configured to store data of the set marking; wherein
- the controller is configured or programmed to repeatedly use the data of the marking stored in the storage for each different inspection.

(Item 7)

The defect inspection apparatus according to item 6, wherein the controller is configured or programmed to, when inspecting a plurality of the inspection targets of a same type individually or when inspecting the same inspection target a plurality of times, perform a current inspection while reading the data of the marking stored in the storage in a first inspection, and superimpose the image of the read marking on a position corresponding to the predetermined region of interest in the image of the current inspection result.

(Item 8)

The defect inspection apparatus according to item 6 or 7, wherein the controller is configured or programmed to store, separately from the data of the marking, data of the image of the inspection region on which the image of the marking has not been superimposed and an image in which the image of the marking has been superimposed on the data of the image of the inspection result in the storage.

(Item 9)

The defect inspection apparatus according to any one of items 1 to 8, wherein the controller is configured or programmed to reflect a modification of data of the marking in data of the set marking when receiving the modification of the data of the marking on the image of the inspection result.

(Item 10)

The defect inspection apparatus according to any one of items 1 to 9, wherein the controller is configured or programmed to detect the defect based on a degree of brightness of each pixel in the image captured by the imager.

(Item 11)

The defect inspection apparatus according to item 10, wherein the controller is configured or programmed to detect the defect based on a luminance value corresponding to the degree of brightness of each pixel in the image captured by the imager.

(Item 12)

The defect inspection apparatus according to item 11, wherein the controller is configured or programmed to determine a state of the inspection target based on a proportion of pixels corresponding to the defect detected in the image captured by the imager.

(Item 13)

The defect inspection apparatus according to item 11 or 12, wherein the controller is configured or programmed to superimpose information based on the luminance value corresponding to the degree of brightness of each pixel in the image captured by the imager on the image of the inspection result.

(Item 14)

The defect inspection apparatus according to any one of items 1 to 13, wherein the controller is configured or programmed to, when the image of the marking surrounding a certain range is superimposed on an image for inspection, exclude a region outside the certain range from an inspection target region and detect the defect within the certain range.

(Item 15)

The defect inspection apparatus according to item 14, wherein the controller is configured or programmed to detect a portion within the certain range having a luminance value corresponding to a degree of brightness of each pixel in the image captured by the imager, the luminance value being equal to or greater than a predetermined threshold, as the defect.

(Item 16)

The defect inspection apparatus according to item 15, wherein the controller is configured or programmed to determine a state of the inspection target based on a proportion of pixels corresponding to the defect detected within the certain range.

(Item 17)

The defect inspection apparatus according to any one of items 1 to 16, further comprising:
 a projector configured to project the image of the inspection result on which the image of the marking has been superimposed onto the inspection target.

DESCRIPTION OF REFERENCE NUMERALS

1: vibrator (exciter)
2: laser illuminator
3, 13: speckle shearing interferometer (interference unit)
4, 14: controller
6: display
7: inspection target
8: storage
35: image sensor (imager)
61: still image
62: moving image
64: marking
65: overlay image (image of the inspection result)
91, 92: defective region (information based on the luminance value)
100, 200: defect inspection apparatus
131: projector
S: predetermined region of interest

The invention claimed is:

1. A defect inspection apparatus comprising:
an imager configured to image an inspection target;
a display configured to display an image based on reflected light from the inspection target captured by the imager; and
a controller configured or programmed to receive a setting of a marking in a predetermined region of interest on the image displayed on the display;
wherein the controller is configured or programmed to superimpose an image of the marking on at least one of a position corresponding to the predetermined region of interest in a moving image based on reflected light captured by the imager, or a position corresponding to the predetermined region of interest in an image of the inspection result of the inspection target's defects obtained using the moving image;
wherein the setting of marking in the predetermined region of interest is received on a still image based on the reflect light captured by the imager displayed on the display.

2. A defect inspection apparatus comprising:
an imager configured to image an inspection target;
a display configured to display an image based on an image captured by the imager; and
a display configured to display an image based on an image captured by the imager, and
a controller configured or programmed to receive a setting of a marking in a predetermined region of interest on the image displayed on the display, wherein:
 the controller is configured or programmed to inspect the inspection target for a defect based on the image captured by the imager, and superimpose an image of the marking on a position corresponding to the predetermined region of interest in an image of an inspection result displayed on the display;
an exciter configured to excite a sonic vibration in the inspection target;
a laser illuminator configured to emit laser light to the inspection target; and
an interference unit configured to cause interference of reflected laser light arriving from different positions on the inspection target excited by the exciter; wherein;
 the imager is configured to image interfered reflected laser light; and
 the controller is configured or programmed to acquire an image representing a vibration state of the inspection target based on the interfered reflected laser light imaged by the imager, and superimpose the image of the marking on the position corresponding to the predetermined region of interest in the image of the inspection result based on the image representing the vibration state of the inspection target.

3. A defect inspection apparatus comprising:
an imager configured to image an inspection target;
a display configured to display an image based on an image captured by the imager; and
a controller configured or programmed to receive a setting of a marking in a predetermined region of interest on the image displayed on the display;
where in the controller is configured or programmed to inspect the inspection target for a defect based on the image captured by the imager, and superimpose an image of the marking on a position corresponding to the predetermined region of interest in an image of an inspection result displayed on the display; and
wherein the controller is configured or programmed to superimpose the image of the marking on the position corresponding to the predetermined region of interest in the image of the inspection result acquired using a still image and a moving image based on the image captured by the imager.

4. The defect inspection apparatus according to claim 3, comprising:
an exciter configured to excite a sonic vibration in the inspection target;
a laser illuminator configured to emit laser light to the inspection target; and
an interference unit configured to cause interference of reflected laser light arriving from different positions on the inspection target excited by the exciter; wherein
the imager is configured to image interfered reflected laser light;
the controller is configured or programmed to acquire the still image representing brightness of light of the inspection target and the moving image representing a vibration state of the inspection target based on the interfered reflected laser light imaged by the imager, and acquire an overlay image in which a vibration discontinuous portion extracted from the moving image has been superimposed on the still image as the image of the inspection result; and
the controller is configured or programmed to receive the setting of the marking in the predetermined region of interest on the still image displayed on the display, and superimpose the image of the marking on a position corresponding to the predetermined region of interest in the overlay image.

5. The defect inspection apparatus according to claim 1, wherein the controller is configured or programmed to superimpose the image of the marking on a position corresponding to the predetermined region of interest in the moving image.

6. The defect inspection apparatus according to claim 1, further comprising:
a storage configured to store data of the set marking; wherein
the controller is configured or programmed to repeatedly use the data of the marking stored in the storage for each different inspection.

7. The defect inspection apparatus according to claim 6, wherein the controller is configured or programmed to, when inspecting a plurality of the inspection targets of a same type individually or when inspecting the same inspection target a plurality of times, perform a current inspection while reading the data of the marking stored in the storage in a first inspection, and superimpose the image of the read marking on a position corresponding to the predetermined region of interest in the image of the current inspection result.

8. The defect inspection apparatus according to claim 6, wherein the controller is configured or programmed to store, separately from the data of the marking, data of the image of the inspection region on which the image of the marking has not been superimposed and an image in which the image of the marking has been superimposed on the data of the image of the inspection result in the storage.

9. The defect inspection apparatus according to claim 1, wherein the controller is configured or programmed to reflect a modification of data of the marking in data of the set marking when receiving the modification of the data of the marking on the image of the inspection result.

10. The defect inspection apparatus according to claim 1, wherein the controller is configured or programmed to detect the defect based on a degree of brightness of each pixel in the image captured by the imager.

11. The defect inspection apparatus according to claim 10, wherein the controller is configured or programmed to detect the defect based on a luminance value corresponding to the degree of brightness of each pixel in the image captured by the imager.

12. The defect inspection apparatus according to claim 11, wherein the controller is configured or programmed to determine a state of the inspection target based on a proportion of pixels corresponding to the defect detected in the image captured by the imager.

13. The defect inspection apparatus according to claim 1, wherein the controller is configured or programmed to superimpose information based on the luminance value corresponding to the degree of brightness of each pixel in the image captured by the imager on the image of the inspection result.

14. The defect inspection apparatus according to claim 1, wherein the controller is configured or programmed to, when the image of the marking surrounding a certain range is superimposed on an image for inspection, exclude a region outside the certain range from an inspection target region and detect the defect within the certain range.

15. The defect inspection apparatus according to claim 14, wherein the controller is configured or programmed to detect a portion within the certain range having a luminance value corresponding to a degree of brightness of each pixel in the image captured by the imager, the luminance value being equal to or greater than a predetermined threshold, as the defect.

16. The defect inspection apparatus according to claim 15, wherein the controller is configured or programmed to determine a state of the inspection target based on a proportion of pixels corresponding to the defect detected within the certain range.

17. The defect inspection apparatus according to claim 1, further comprising:
a projector configured to project the image of the inspection result on which the image of the marking has been superimposed onto the inspection target.

* * * * *